United States Patent [19]

Moffatt et al.

[11] Patent Number: 5,508,237
[45] Date of Patent: * Apr. 16, 1996

[54] FLAT PANEL DISPLAY

[75] Inventors: Dawne M. Moffatt, Corning; Dean V. Neubauer, Horseheads, both of N.Y.

[73] Assignee: Corning Incorporated, Corning, N.Y.

[ * ] Notice: The portion of the term of this patent subsequent to Apr. 24, 2015, has been disclaimed.

[21] Appl. No.: 288,300

[22] Filed: Aug. 10, 1994

Related U.S. Application Data

[63] Continuation-in-part of Ser. No. 212,060, Mar. 14, 1994, abandoned.

[51] Int. Cl.$^6$ ............................ C03C 3/078; C03C 3/091
[52] U.S. Cl. ...................... 501/69; 501/70; 501/66; 65/99.2
[58] Field of Search ................... 501/66, 69, 70; 65/90, 99.2

[56] References Cited

U.S. PATENT DOCUMENTS

| | | |
|---|---|---|
| 3,496,401 | 2/1970 | Dumbaugh, Jr. . |
| 3,978,362 | 8/1976 | Dumbaugh, Jr. et al. . |
| 4,060,423 | 11/1977 | Thomas . |
| 4,180,618 | 12/1979 | Alpha et al. . |
| 4,255,198 | 3/1981 | Danielson et al. . |
| 4,302,250 | 11/1981 | Danielson . |
| 4,394,453 | 7/1983 | Dumbaugh, Jr. . |
| 4,409,337 | 10/1983 | Dumbaugh, Jr. . |
| 4,441,051 | 4/1984 | Thomas . |
| 4,634,683 | 1/1987 | Dumbaugh, Jr. . |
| 4,634,684 | 1/1987 | Dumbaugh, Jr. . |
| 4,824,808 | 4/1989 | Dumbaugh, Jr. . |
| 4,994,415 | 2/1991 | Imai et al. ........................ 501/66 |
| 5,116,787 | 5/1992 | Dumbaugh, Jr. . |
| 5,116,788 | 5/1992 | Dumbaugh, Jr. . |
| 5,116,789 | 5/1992 | Dumbaugh, Jr. . |
| 5,348,916 | 9/1994 | Kushitani et al. ................ 501/66 |

FOREIGN PATENT DOCUMENTS

| | | |
|---|---|---|
| 2675795 | 10/1992 | France . |
| 63-283710 | 11/1988 | Japan . |
| 4-16003 | 6/1992 | Japan . |

*Primary Examiner*—Karl Group
*Attorney, Agent, or Firm*—Milton M. Peterson

[57] ABSTRACT

A flat panel display comprising an aluminosilicate glass panel that exhibits a strain point higher than 640° C., a weight loss less than 20 mg/cm$^2$ after immersion for 24 hours in an aqueous 5% by weight HCl solution at 95° C., a CTE in the range of $31–57 \times 10^{-7}$/° C., is nominally free of alkali metal oxides and has a composition consisting essentially of, as calculated in percent by weight on an oxide basis, 49–67% $SiO_2$, at least 6% $Al_2O_3$, the $Al_2O_3$ being 6–14% in conjunction with 55–67% $SiO_2$ and 16–23% in conjunction with 49–58% $SiO_2$, $SiO_2+Al_2O_3>68\%$, 0–15% $B_2O_3$, at least one alkaline earth metal oxide selected from the group consisting of, in the proportions indicated, 0–21% BaO, 0–15% SrO, 0–18% CaO, 0–8% MgO and 12–30% BaO+CaO+SrO+MgO.

23 Claims, No Drawings

FLAT PANEL DISPLAY

This application is a Continuation-In-Part of U.S. Ser. No. 08/212,060, filed Mar. 14, 1994, now abandoned.

FIELD OF THE INVENTION

A flat panel display device having an aluminosilicate glass panel exhibiting physical and chemical properties necessary for such devices and their production.

BACKGROUND OF THE INVENTION

Flat panel displays have received a great deal of attention recently. Thus far, much of the attention has centered on small units such as are used in laptop computers. However, increasing consideration is being given to larger units for information and entertainment applications. One particular form of flat panel display is known as a liquid crystal display.

Liquid crystal displays (LCDs) are flat panel display devices which depend upon external sources of light for illumination. They may take one of two basic matrix types, intrinsic or extrinsic matrix addressed. The intrinsic matrix type relies upon the threshold properties of the liquid crystal material. The extrinsic, or active matrix (AM), type has an array of diodes, metal-insulator-metal (MIM) devices, or thin film transistors (TFTs), that supplies an electronic switch to each pixel.

In both cases, two sheets of glass form the structure of the display. The separation between the two sheets is the critical gap dimension, of the order of 5–10 μm. The glass sheets must be transparent, and must withstand the chemical conditions to which they are exposed during display processing. Otherwise, the needs of the two matrix types differ.

Intrinsically addressed LCDs are fabricated using thin film deposition techniques at temperatures ≦350° C., followed by photolithographic patterning. As a result, the substrate requirements therefore are often the same as those for segmented displays. Soda-lime-silica glass with a barrier layer has proven to be adequate for most needs.

A high performance version of intrinsically addressed LCDs, the super twisted nematic (STN) type, has an added requirement of extremely precise flatness for the purpose of holding the gap dimensions uniform. Because of that requirement, soda-lime-silica glass used for those displays must be polished. Alternatively, a precision formed, barium aluminoborosilicate glass, marketed by Corning Incorporated, Corning, N.Y. as Code 7059, may be used without polishing.

Extrinsically addressed LCDs can be further subdivided into two categories; viz., one based on MIM or amorphous silicon (a-Si) devices, and the other based on polycrystalline silicon (poly-Si) devices. The substrate requirements of the MIM or a-Si type are similar to the STN application. Corning Code 7059 sheet glass is the preferred substrate because of its very low sodium content, i.e., less than 0.1% $Na_2O$ by weight, its dimensional precision, and its commercial availability.

Devices formed from poly-Si, however, are processed at higher temperatures than those that are employed with a-Si TFTs. Substrates capable of use temperatures (taken to be 25° C. below the strain point of the glass) of 600°–800° C. are demanded. The actual temperature required is mandated by the particular process utilized in fabricating the TFTs. Those TFTs with deposited gate dielectrics require 600°–650° C., while those with thermal oxides call for about 800° C.

Both a-Si and poly-Si processes demand precise alignment of successive photolithographic patterns, thereby necessitating that the thermal shrinkage of the substrate be kept low. The higher temperatures required for poly-Si mandate the use of glasses exhibiting higher strain points than soda-lime-silica glass and Corning Code 7059 glass in order to avoid thermal deformation of the sheet during processing. As can be appreciated, the lower the strain point, the greater this dimensional change. Thus, there has been considerable research to develop glasses demonstrating high strain points so that thermal deformation is minimized during device processing at temperatures greater than 600° C., and preferably, higher than 650° C.

U.S. Pat. No. 4,824,808 (Dumbaugh, Jr.) lists four properties which have been deemed mandatory for a glass to exhibit in order to fully satisfy the needs of a substrate for LCDs:

First, the glass must be essentially free of intentionally added alkali metal oxide to avoid the possibility that alkali metal from the substrate can migrate into the transistor matrix;

Second, the glass substrate must be sufficiently chemically durable to withstand the reagents used in the TFT matrix deposition process;

Third, the expansion mismatch between the glass and the silicon present in the TFT array must be maintained at a relatively low level even as processing temperatures for the substrates increase; and Fourth, the glass must be capable of being produced in high quality thin sheet form at low cost; that is, it must not require extensive grinding and polishing to secure the necessary surface finish.

That last requirement is most difficult to achieve inasmuch as it demands a sheet glass production process capable of producing essentially finished glass sheet. Currently, the overflow downdraw sheet manufacturing process is employed. This process is described in U.S. Pat. No. 3,338,696 (Dockerty) and U.S. Pat. No. 3,682,609 (Dockerty). That process requires a glass exhibiting a very high viscosity at the liquidus temperature plus long term stability, e.g., periods of 30 days, against devitrification at melting and forming temperatures.

Corning Code 7059 glass, supra, is currently employed in the fabrication of LCDs. That glass, consisting essentially, in weight percent, of about 50% $SiO_2$, 15% $B_2O_3$, 10% $Al_2O_3$, and 24% BaO, is nominally free of alkali metal oxides, and exhibits a linear coefficient of thermal expansion, CTE, (25°–300° C.) of about $46 \times 10^{-7}$/°C. and a viscosity at the liquidus temperature in excess of 60,000 Pa.s (600,000 poises). The high liquidus viscosity of the glass enables it to be drawn into sheet via the overflow downdraw sheet processing technique, but its relatively low strain point (~593° C.) is adequate only for processing a-Si devices and not for poly-Si devices.

Accordingly, extensive research has been directed at developing glasses designed to meet at least three general requirements. Initially, the glasses had to be adapted to use in fabricating poly-Si devices. Next, they had to be capable of being formed into sheet by the overflow downdraw process. Finally, they had to have linear CTEs that closely matched silicon.

The fruits of such research are reported, for example, in U.S. Pat. Nos. 4,409,337; 4,824,808; 5,116,787; 5,116,788;

and 5,116,789, all issued in the name of W. H. Dumbaugh, Jr. The properties of these glasses, as well as their shortcomings, are reviewed in pending application Ser. No. 08/008,560 filed in the names of Dumbaugh, Jr. et al. and assigned to the assignee of the subject application.

A recent advance in liquid crystal technology termed "chip-on-glass" (COG) has further emphasized the need for the substrate glass to closely match silicon in thermal expansion. Thus, the initial LCD devices did not have their driver chips mounted on the substrate glass. Instead, the silicon chips were mounted remotely and were connected to the LCD substrate circuitry with compliant or flexible wiring. As LCD device technology improved and as the devices became larger, these flexible mountings became unacceptable, both because of cost and of uncertain reliability. This situation led to Tape Automatic Bonding (TAB) of the silicon chips. In that process the silicon chips and electrical connections to the chips were mounted on a carrier tape, that subassembly was mounted directly on the LCD substrate, and thereafter the connection to the LCD circuitry was completed. TAB decreased cost while improving reliability and increasing the permitted density of the conductors to a pitch of approximately 200 μm—all significant factors. COG, however, provides further improvement over TAB with respect to those three factors. Hence, as the size and quality requirements of LCD devices increase, COG is demanded for those devices dependent upon the use of integrated circuit silicon chips. For that reason, the substrate glass must demonstrate a linear coefficient of thermal expansion closely matching that of silicon; i.e., the glass must exhibit a linear coefficient of thermal expansion (0°–300° C.) between $31-44\times10^{-7}/°C.$, most preferably $32-40\times10^{-7}/°C.$ The high viscosity value at the liquidus required for the overflow downdraw process, 600,000 poises (60,000 Pa.s), has been difficult to obtain in conjunction with the several other properties required for poly-Si devices. Consequently, attention has been given to other sheet-forming processes where the viscosity factor is not of such great significance. These include the float process and a redraw process.

The float process involves drawing a continuous sheet of glass over the surface of a molten metal, such as molten tin. The surface contacting the molten metal is not exposed during drawing, and hence is relatively smooth and free from defects. This has the virtue of requiring finishing of only one surface. It is a primary purpose of the present invention to provide panels for flat panel display devices, in particular, LCD devices embodying poly-Si chips. A further purpose is to provide such panels that can be fabricated by a method other than the overflow downdraw process, such as the float process.

SUMMARY OF THE INVENTION

The present invention resides in a flat panel display comprising an aluminosilicate glass panel that exhibits a strain point higher than 640° C., CTEs in the range of $31-57\times10^{-7}/°C.$, a weight loss less than 20 mg/cm² after immersion for 24 hours in an aqueous 5% by weight HCl solution at 95° C., that is nominally free from alkali metal oxides and has a composition consisting essentially, calculated in weight percent on the oxide basis, of 49–67% $SiO_2$, at least 6% $Al_2O_3$, the $Al_2O_3$ being 6–14% in conjunction with 55–67% $SiO_3$ and 16–23% in conjunction with 49–58% $SiO_2$, $SiO_2+Al_2O_3>68\%$, 0–15% $B_2O_3$, at least one alkaline earth metal oxide selected from the group consisting of, in the preparations indicated, 0–21% BaO, 0–15% SrO, 0–18% CaO, 0–8% MgO and 12–30% BaO+CaO+SrO+MgO.

The invention further resides in a method of producing a glass panel for a flat panel display which comprises melting a batch for an aluminosilicate glass consisting essentially of, as calculated in percent by weight on an oxide basis, 49–67% $SiO_2$, at least 6% $Al_2O_3$, the $Al_2O_3$ being 6–14% in conjunction with 55–67% $SiO_2$ and 16–23% in conjunction with 49–58% $SiO_2$, $SiO_2+Al_2O_3>68\%$, 0–15% $B_2O_3$, at least one alkaline earth metal oxide selected from the group consisting of, in the indicated proportions, 0–21% BaO, 0–15% SrO, 0–18% CaO, 0–8% MgO and 12–30% BaO+CaO, SrO+MgO, and drawing a thin sheet of molten glass from the melt.

The invention also contemplates an aluminosilicate glass exhibiting a strain point higher than 640° C., a weight loss less than 20 mg/cm² after immersion for 24 hours in an aqueous 5% by weight HCl solution at 95° C., a CTE between 31 and $57\times10^{-7}/°C.$, nominally free of alkali metal oxides and having a composition consisting essentially of, as calculated in percent by weight on an oxide basis, 49–67% $SiO_2$, at least 6% $Al_2O_3$, the $Al_2O_3$ being 6–14% in conjunction with 55–67% $SiO_2$ and 16–23% in conjunction with 49–58% $SiO_2$, $SiO_2+Al_2O_3>68\%$, 0–15% $B_2O_3$, at least one alkaline earth metal oxide selected from the group consisting of, in the proportions indicated, 0–21% BaO, 0–15% SrO, 0–18% CaO, 0–8% MgO and 12–30% BaO+CaO+SrO+MgO.

DESCRIPTION OF THE INVENTION

The invention arose from a desire for flat display device panels that could be produced by a method that did not impose the requirement of the overflow downdraw process. In particular, it was desired to avoid the need for the very high viscosity at the liquidus temperature of over 60,000 Pa.s (600,000 poises).

At the same time, certain other requirements must be met, however. These include a glass strain point greater than 640° C., good chemical durability, freedom from alkali metals and a controlled coefficient of thermal expansion (CTE).

We have found that these several requirements may be met by members of a nominally alkali metal-free, aluminosilicate glass family having compositions, calculated on an oxide basis, consisting essentially of 49–67% $SiO_2$, at least 6% $Al_2O_3$, the $Al_2O_3$ being 6–14% $Al_2O_3$ in conjunction with 55–67% $SiO_2$, and 16–23% in conjunction with 49–58% $SiO_2$, $SiO_2+Al_2O_3>68\%$, 0–15% $B_2O$, at least one alkaline earth metal oxide selected from the group consisting of, in the proportions indicated, of 0–21% BaO, 0–15% SrO, 0–18% CaO, 0–8% MgO and 12–30% BaO+SrO+CaO+MgO.

Compliance with those specified composition intervals has been found necessary in order to obtain glasses illustrating the desired matrix of chemical, forming, and physical properties, as is demonstrated below.

$SiO_2$ and $Al_2O_3$ are the glass-forming oxides. At least 49% $SiO_2$ and 6% $Al_2O_3$ are required for this purpose, as well as to provide the desired high strain point. Glass melting tends to become difficult with $SiO_2$ contents greater than 67% and $Al_2O_3$ contents greater than 23%.

$SiO_2$ and $Al_2O_3$ are also of concern with respect to glass durability. In this respect, however, the $SiO_2$ and $Al_2O_3$ contents are interdependent. Thus, with $Al_2O_3$ contents in the range of 6–14%, a $SiO_2$ content of at least 55%, and preferably at least 60%, is necessary to provide the required chemical durability. With an $Al_2O_3$ content in the range of 16–23%, the $SiO_2$ content may be as low as 49% while obtaining adequate durability. The total $SiO_2+Al_2O_3$ content should be greater than about 68% to achieve the desired durability.

$B_2O_3$ tends to soften the glass, that is, lower the melting temperature and facilitate melting. However, it lowers the strain point and is detrimental to durability, particularly in large amounts. Consequently, the $B_2O_3$ content should not exceed about 15%, and preferably is no more than 8%.

Where silicon chips are to be mounted on the glass, and a CTE of $31-44 \times 10^{-7}/°C$. is necessary, BaO content is preferably maintained low. Other alkaline earth metal oxides and/or $Al_2O_3$ may be substituted.

In general, the alkaline earth metals increase CTE in this order Ba>Sr>Ca>Mg with BaO having the greatest effect and MgO the least.

In addition to the constituents recited above, a variety of optional constituents are also contemplated. These include $TiO_2$, $ZrO_2$, ZnO, $La_2O_3$, $Ta_2O_5$, $Nb_2O_5$ and $Y_2O_3$. Preferably, these oxides are not present in amounts exceeding about 5% by weight since they tend to increase density and may decrease the strain point. In general, any benefits, such as to refractive index or durability, may be obtained otherwise.

Alkali metals and halides tend to poison liquid crystal fluids, and hence are avoided except as unavoidable impurities.

A commonly accepted measure of chemical durability is weight loss when a glass sample is immersed in a 5% by weight solution of HCl for 24 hours at 95° C. For present purposes, the weight loss must be less than 20 $mg/cm^2$, is preferably below 5, and most preferably below one $mg/cm^2$.

There are two levels of coefficient of thermal expansion (CTE) that are relevant in glass panels for display panels, particularly LCD devices. One level is based on what had become a standard in the trade, Code 7059 glass. That glass has a CTE of $46 \times 10^{-7}/°C$., and a CTE range of $44-57 \times 10^{-7}/°C$. has been considered compatible. Preferably, the range is $45-50 \times 10^{-7}/°C$.

We have found two aluminosilicate sub-families A and B that provide CTE values at this level. Glasses having compositions that fall within these sub-families consist essentially of, as calculated in weight percent on an oxide basis:

|  | A | B |
|---|---|---|
| $SiO_2$ | 50–57 | 55–67 |
| $Al_2O_3$ | 16–22 | 6–14 |
| $B_2O_3$ | 0–5.5 | 0–7.5 |
| MgO | 0.5–3 | 0–6.5 |
| CaO | 1–12.5 | 0–18.5 |
| SrO | 0.5–15 | 0–15.5 |
| BaO | 1–21 | 1–9.5 |
| MgO + CaO + SrO + BaO | — | 16.5–28 |

The other CTE level is based on a desire to match silicon, thus permitting direct chip attachment. Silicon has a CTE of $36 \times 10^{-7}/°C$. Accordingly, a CTE range for glass panels may be $31-44 \times 10^{-7}/°C$., preferably $32-40 \times 10^{-7}/°C$.

To achieve CTE values within these ranges, we have found two aluminosilicate sub-families C and D that meet the requirement. Glasses having compositions that fall within these sub-families consist essentially of, as calculated in weight percent on an oxide basis:

|  | C | D |
|---|---|---|
| $SiO_2$ | 49–58 | 57–66 |
| $Al_2O_3$ | 17.5–23 | 8–14 |
| $B_2O_3$ | 0–14.5 | 0–13 |
| MgO | 0–8 | 0–4.5 |
| CaO | 0–9 | 0–9 |
| SrO | 0.4–13.5 | 0.5–13 |
| BaO | 0–21 | 2–21 |
| MgO + CaO + SrO + BaO | 13–28 |  |

In another aspect, the invention contemplates a method of producing panels for LCD devices by melting a glass as described above, forming sheet glass from the melt by such processes as the float process, redrawing or rolling, and cutting the sheet into panel size.

DESCRIPTION OF PREFERRED EMBODIMENTS

Table I reports a number of glass compositions. The compositions are expressed in terms of parts by weight on the oxide basis, illustrating the compositional parameters of the present inventive glasses. The sum of the individual components closely approximates 100, being slightly lower due to omission of a fining agent, such as $As_2O_3$. Hence, for all practical purposes, the listed values may be considered to reflect weight percent.

The actual batch materials may comprise the desired oxides. They may also comprise other compounds, which, when melted together with the other batch constituents, will be converted into the desired oxides in the proper proportions. For example, $CaCO_3$ and $BaCO_3$ can supply the source of CaO and BaO, respectively.

Glass batches based on these compositions were compounded. The batches were tumble mixed together thoroughly to assist in obtaining a homogeneous melt, and then charged into platinum crucibles. After placing lids thereon, the crucibles were introduced into furnaces operating at temperatures of 1650° C. To assure the formation of glasses free form inclusions and cords, a two-step melting practice was undertaken. The batch was first melted for about 16 hours and stirred. It was thereafter poured as a fine stream into a bath of tap water to form finely-divided particles of glass. This process is termed "drigaging" in the glass art. In the second step, the finely-divided glass particles (after drying) were remelted at 1650° C. for about four hours. The melts were stirred in both directions, i.e., both clockwise and counterclockwise. The melts were then poured onto steel plates to make glass slabs having the approximate dimensions 18"×6"×0.5" (~45.7×15.2×1.3 cm). Those slabs were then transferred immediately to an annealer operating at about 725° C.

It must be recognized that the above description reflects a laboratory melting procedure only. Thus, the inventive glasses are quite capable of being melted and formed utilizing large scale, commercial glass melting and forming equipment. Where desired, fining agents, such as the oxides of arsenic and antimony, may be added in customary amounts. The small residual remaining in the glass has no substantial effect upon the physical properties of the glass.

Table I also recites measurements of several chemical and physical properties determined on the glasses in accordance with measuring techniques conventional in the glass art. The linear coefficient of thermal expansion (CTE) over the temperature range 0°–300° C. is expressed in terms of X10⁻⁷/°C. The softening point (S.P.), and the strain point (St.P) are expressed in terms of °C., and were determined via fiber elongation. The durability (Dur) in HCl was evaluated by determining the weight loss (mg/cm$^2$) after immersion in a bath of aqueous 5% by weight HCl operating at 95° C. for 24 hours.

TABLE I

|  | 1 | 2 | 3 | 4 | 5 | 6 |
|---|---|---|---|---|---|---|
| SiO$_2$ | 65 | 65.4 | 50.6 | 65 | 55.7 | 64.7 |
| Al$_2$O$_3$ | 8.2 | 13 | 22.1 | 8.1 | 13.6 | 8.0 |
| B$_2$O$_3$ | 7.8 | — | 6.0 | 5.8 | 5.1 | — |
| MgO | 3.1 | — | — | 0.3 | 3.0 | — |
| CaO | — | — | — | 18 | 7.1 | 5.7 |
| SrO | 13 | 0.4 | 12.8 | — | 5.2 | 12.9 |
| BaO | 2.2 | 20.7 | 8.2 | 2.2 | 9.3 | 7.7 |
| CTE | 38.6 | 38.9 | 41.3 | 48.5 | 46.8 | 49.4 |
| St.P. | 692 | 810 | 719 | 669 | 662 | 710 |
| S.P. | 1016 | 985 | 1003 | 1093 | 913 | 980 |
| Dur. | 2.73 | 0.03 | 6.65 | 0.69 | 0.22 | 0.01 |

|  | 7 | 8 | 9 | 10 | 11 | 12 |
|---|---|---|---|---|---|---|
| SiO$_2$ | 50.3 | 49.9 | 65.3 | 61.2 | 50.3 | 50.3 |
| Al$_2$O$_3$ | 20.1 | 21.8 | 8.0 | 13.3 | 21.5 | 21.7 |
| B$_2$O$_3$ | 0.6 | — | — | 5.5 | — | — |
| MgO | 0.6 | 5.9 | 5.9 | 2.9 | 5.8 | 3.1 |
| CaO | 6.4 | 0.3 | — | 8.7 | 0.6 | 9.2 |
| SrO | 0.4 | 0.5 | 12.6 | 5.9 | 0.4 | 13 |
| BaO | 20.9 | 20.5 | 7.0 | 2.4 | 20.2 | 2.2 |
| CTE | 48.7 | 43.5 | 44.9 | 43.4 | 43.6 | 51.3 |
| St.P. | 734 | 750 | 714 | 674 | 744 | 728 |
| S.P. | 1008 | 1013 | 993 | 928 | 1012 | 972 |
| Dur. | 4.9 | 5.4 | 0.01 | 0.07 | 5 | 240 |

Table IA records the same glass compositions but reported in terms of mole percent on the oxide basis.

TABLE IA

|  | 1 | 2 | 3 | 4 | 5 | 6 |
|---|---|---|---|---|---|---|
| SiO$_2$ | 72.43 | 80.18 | 63.56 | 68.05 | 64.03 | 75.05 |
| Al$_2$O$_3$ | 5.33 | 9.38 | 16.36 | 5.02 | 9.20 | 5.48 |
| B$_2$O$_3$ | 7.52 | 0.00 | 6.48 | 5.28 | 5.04 | 0.00 |
| MgO | 5.16 | 0.00 | 0.00 | 0.39 | 5.12 | 0.00 |
| CaO | 0.00 | 0.00 | 0.00 | 20.19 | 8.72 | 7.09 |
| SrO | 8.39 | 0.28 | 9.33 | 0.00 | 3.49 | 8.67 |
| BaO | 0.97 | 9.93 | 4.04 | 0.90 | 4.18 | 3.51 |

|  | 7 | 8 | 9 | 10 | 11 | 12 |
|---|---|---|---|---|---|---|
| SiO$_2$ | 63.65 | 62.03 | 73.34 | 61.56 | 62.46 | 56.70 |
| Al$_2$O$_3$ | 14.96 | 15.94 | 5.27 | 10.57 | 15.70 | 14.39 |
| B$_2$O$_3$ | 0.67 | 0.00 | 0.00 | 0.00 | 0.00 | 0.00 |
| MgO | 1.23 | 11.05 | 9.90 | 0.33 | 10.76 | 15.59 |
| CaO | 8.63 | 0.42 | 0.00 | 18.83 | 0.81 | 3.72 |
| SrO | 0.27 | 0.34 | 8.20 | 0.00 | 0.26 | 8.42 |
| BaO | 10.35 | 9.97 | 3.09 | 8.54 | 9.82 | 0.95 |

An examination of the above glasses illustrates the care in composition control that must be exercised in preparing glasses to provide the several properties that characterize the present invention. Thus, compositions 1, 4 and 9 are quite similar, except that 1 has a substantial SrO content, 4 has a substantial CaO content, and 9 omits B$_2$O$_3$ in favor of BaO. The consequence is a continuously higher strain point from 1 to 4 to 9, with 1 being marginally acceptable.

Comparisons also illustrate the effect of various oxide contents on durability. Thus, comparing compositions 11 and 12 indicates that substituting alkaline earth metal oxides has an enormous effect on durability. Also, comparing compositions 1 and 6 suggests the beneficial effect of omitting B$_2$O$_3$ in favor of alkaline earth metal oxides.

As noted earlier, a preferred CTE range for glass panels compatible with Code 7059 glass is 45–50×10⁻⁷/°C. Glasses in aluminosilicate sub-families A' and B' have CTEs in this range and have compositions consisting essentially of, as calculated in weight percent on an oxide basis:

|  | A' | B' |
|---|---|---|
| SiO$_2$ | 50–57 | 55–67 |
| Al$_2$O$_3$ | 16–20 | 6–<13 |
| B$_2$O$_3$ | 0–5.5 | 0–7.5 |
| MgO | 2–2.75 | 2–6.5 |
| CaO | 1–<7 | 0–17.5 |
| SrO | 0.5–15 | 0–14.5 |
| BaO | 1–21 | 2–9.5 |

TABLE II sets forth exemplary compositions within these sub-families. Compositions 13, 14 and 15 exemplify the A' sub-family, while 16, 17 and 18 exemplify the B' sub-family.

TABLE II

|  | 13 | 14 | 15 | 16 | 17 | 18 |
|---|---|---|---|---|---|---|
| SiO$_2$ | 56.1 | 52.9 | 53.7 | 65.5 | 56.6 | 66.9 |
| Al$_2$O$_3$ | 17.0 | 18.2 | 18.0 | 8.1 | 11.2 | 6.1 |
| B$_2$O$_3$ | — | 2.0 | 4.7 | — | 7.4 | — |
| MgO | 2.3 | 2.4 | 2.4 | 6.1 | 2.2 | 6.2 |
| CaO | 6.8 | 6.9 | 6.5 | 5.2 | 2.1 | — |
| SrO | 5 | 5.1 | 5.1 | 12.9 | 12.0 | 13.3 |
| BaO | 12.9 | 12.6 | 9.6 | 2.2 | 8.7 | 7.5 |
| CTE | 48.3 | 48.4 | 45.3 | 48.1 | 47.3 | 45.5 |
| Strain | 718 | 695 | 677 | 693 | 650 | 699 |
| HCl | 0.08 | 0.62 | 1.9 | 0.03 | 0.3 | 0.01 |
| Density | 2.31 | 2.80 | 2.70 | 2.70 | 2.72 | 2.73 |

Preferred CTE ranges for glass panels adapted to use with silicon have been noted as having a CTE range of 32–40×10⁻⁷/°C. Glasses in aluminosilicate sub-families C' and D' have CTEs within that range and have compositions that consist essentially of, as calculated in weight percent on an oxide basis:

|  | C' | D' |
|---|---|---|
| SiO$_2$ | 54–57 | 57–65.5 |
| Al$_2$O$_3$ | 17.5–23 | 8–13 |
| B$_2$O$_3$ | 5–15 | 4–13 |
| MgO | 2–2.75 | 2–3.5 |
| CaO | 1.5–<7 | 0–6.5 |
| SrO | 2–6 | 0–13 |
| BaO | 0.5–9.5 | 2–21 |

TABLE III sets forth exemplary compositions within these sub-families. The C' sub-family is exemplified by compositions 19, 20 and 21, while the D' sub-family is exemplified by compositions 22, 23 and 24.

TABLE III

|  | 19 | 20 | 21 | 22 | 23 | 24 |
|---|---|---|---|---|---|---|
| SiO$_2$ | 56.6 | 55.5 | 56.2 | 64.6 | 65 | 64.3 |
| Al$_2$O$_3$ | 22.4 | 18.4 | 22.9 | 12.9 | 8.2 | 13 |
| B$_2$O$_3$ | 7.8 | 9.3 | 5.9 | 4.4 | 7.8 | 4.4 |
| MgO | 2.3 | 2.3 | 2.4 | 2.2 | 3.1 | 2.2 |
| CaO | 3.4 | 6.9 | 4.9 | 6.3 | — | 6.3 |
| SrO | 4.9 | 5.0 | 5.0 | 0.8 | 13 | 1.2 |
| BaO | 2.6 | 2.6 | 2.7 | 8.8 | 2.2 | 8.7 |
| CTE | 32.2 | 40 | 35.4 | 38.8 | 38.6 | 38.8 |
| Strain | 692 | 666 | 706 | 683 | 692 | 686 |
| HCl | 1.8 | 2.6 | 0.8 | 0.02 | 2.7 | 0.02 |
| Density | 2.52 | 2.54 | 2.56 | 2.55 | 2.54 | 2.56 |

In a preferred embodiment of the invention, a glass panel for a flat panel display has a strain point greater than 660° C. and has a weight loss less than 1 mg/cm² in the HCl test described earlier. We have found that glasses having compositions falling within two aluminosilicate sub-families meet these preferred qualifications. The two families, E and F, have compositions consisting essentially of, as calculated in weight percent on an oxide basis:

|  | E | F |
|---|---|---|
| $SiO_2$ | 54–58 | 55–67 |
| $Al_2O_3$ | 16–23 | 6–14 |
| $B_2O_3$ | 0–6 | 0–7.5 |
| MgO | 2–4.5 | 0–7 |
| CaO | 1–12.5 | 0–18.5 |
| SrO | 2.5–15.5 | 0–15 |
| BaO | 0–14.5 | 1–21 |
| MgO + CaO + SrO + BaO | 15–27 | 18–28 |

TABLES IVE and IVF set forth, in approximate weight percent as analyzed on an oxide basis, the compositions and relevant properties of several representative examples of each sub-family, respectively:

TABLE IVE

|  | 25 | 26 | 27 | 28 | 29 | 30 |
|---|---|---|---|---|---|---|
| $SiO_2$ | 55.16 | 56.95 | 56.7 | 57.63 | 58.19 | 54.69 |
| $Al_2O_3$ | 18.19 | 16.81 | 22.63 | 19.21 | 19.43 | 17.79 |
| $B_2O_3$ | 0.95 | 0 | 0.997 | 5.33 | 5.35 | 0.94 |
| MgO | 2.23 | 2.25 | 2.31 | 2.6 | 2.67 | 2.17 |
| CaO | 1.46 | 4.7 | 6.7 | 8.63 | 8.76 | 1.39 |
| SrO | 13.06 | 4.82 | 4.86 | 5.5 | 5.61 | 14.25 |
| BaO | 8.94 | 14.47 | 5.77 | 1.09 | 0 | 8.76 |
| CTE | 45.4 | 46.8 | 41.8 | 42 | 41 | 46.8 |
| Strain | 731 | 724 | 748 | 684 | 688 | 722 |
| HCl | 0.074 | 0.06 | 0.57 | 0.16 | 0.48 | 0.11 |
| Density | 2.79 | 2.429 | 2.676 | 2.579 | 2.564 | 2.819 |

TABLE IVF

|  | 31 | 32 | 33 | 34 | 35 | 36 |
|---|---|---|---|---|---|---|
| $SiO_2$ | 55.7 | 55.53 | 56.9 | 65.49 | 66.93 | 66.85 |
| $Al_2O_3$ | 13.6 | 13.3 | 13.03 | 8.14 | 6.1 | 6.23 |
| $B_2O_3$ | 5.1 | 3.2 | 7.3 | 0 | 0 | 0 |
| MgO | 3 | 2.27 | 2.2 | 6.08 | 6.23 | 0.13 |
| CaO | 7.1 | 4.08 | 0 | 5.16 | 0 | 5.69 |
| SrO | 5.2 | 12.59 | 11.9 | 12.92 | 13.26 | 13.29 |
| BaO | 9.3 | 9.03 | 8.7 | 2.22 | 7.48 | 7.8 |
| CTE | 46.8 | 50.2 | 45 | 48.1 | 45.5 | 50.9 |
| Strain | 662 | 675 | 662 | 693 | 699 | 699 |
| HCl | 0.22 | 0.076 | 0.31 | 0.03 | 0.0134 | 0.0058 |
| Density | 2.705 | 2.799 | 2.692 | 2.695 | 2.725 | 2.741 |

A further preferred embodiment constitutes glass panels having a density less than 2.5 grams/cc. Glasses meeting this requirement fall within an aluminosilicate sub-family G having the following constituent ranges consisting essentially of, as analyzed on an oxide basis:

| $SiO_2$ | 54.8–57 |
|---|---|
| $Al_2O_3$ | 16.8–21.8 |
| $B_2O_3$ | 0–14 |
| MgO | 2.2–2.5 |
| CaO | 1.5–9.5 |
| SrO | 4.5–5.5 |
| BaO | 0.1–14.5 |
| MgO + CaO + SrO + BaO | 12.5–27 |

TABLE V sets forth in approximate weight percent, as analyzed on an oxide basis, compositions and relevant properties for representative examples:

TABLE V

|  | 37 | 38 | 39 | 40 | 41 | 42 |
|---|---|---|---|---|---|---|
| $SiO_2$ | 55.9 | 56.08 | 56.95 | 56.14 | 56.6 | 56.72 |
| $Al_2O_3$ | 21.73 | 16.98 | 16.81 | 21.1 | 16.92 | 19.04 |
| $B_2O_3$ | 9.76 | 0 | 0 | 1.06 | 0.99 | 9.73 |
| MgO | 2.45 | 2.28 | 2.25 | 2.28 | 2.31 | 2.37 |
| CaO | 2.36 | 6.78 | 4.7 | 5.59 | 9.4 | 6.95 |
| SrO | 5.13 | 5 | 4.82 | 4.84 | 4.78 | 5.07 |
| BaO | 2.67 | 12.86 | 14.47 | 8.99 | 8.91 | 0.12 |
| CTE | 31.2 | 48.3 | 46.8 | 43.6 | 49.3 | 37.6 |
| Strain | 680 | 718 | 724 | 737 | 710 | 670 |
| HCl | 3.36 | 0.08 | 0.06 | 0.27 | 0.15 | 4.15 |
| Density | 2.496 | 2.312 | 2.429 | 2.467 | 2.265 | 2.494 |

We claim:

1. A flat panel display comprising an aluminosilicate glass panel that exhibits a strain point higher than 640° C., a weight loss less than 2.5 mg/cm² after immersion for 24 hours in an aqueous 5% by weight HCl solution at 95° C., a CTE in the range of 31–57×10⁻⁷/°C., is nominally free of alkali metal oxides and has a composition consisting essentially of, as calculated in percent by weight on an oxide basis, 49–67% $SiO_2$, at least 6% $Al_2O_3$, the $Al_2O_3$ being 6–14% in conjunction with 55–67% $SiO_2$ and 16–23% in conjunction with 49–58% $SiO_2$, $SiO_2+Al_2O_3>68\%$, 0 to less than 8% $B_2O_3$, at least one alkaline earth metal oxide selected from the group consisting of, in the proportions indicated, 0–21% BaO, 0–15% SrO, 0–7.1% CaO, 0–8% MgO and 12–30% BaO+CaO+SrO+MgO.

2. A flat panel display in accordance with claim 1 in which the glass panel has a CTE in the range of 31–44×10⁻⁷/°C. and the glass is selected from a group of aluminosilicate sub-families consisting of glasses having compositions consisting essentially of, as calculated in weight percent on an oxide basis;

a. 49–58% $SiO_2$, 17.5–23% $Al_2O_3$, 0 to less than 8% $B_2O_3$, 0–8% MgO, 0–7.1% CaO, 0.4–13.5% SrO, 0–21% BaO and MgO+CaO+SrO+BaO being 13–28%, b. 57–66% $SiO_2$, 8–14% $Al_2O_3$, 0 to less than 8% $B_2O_3$, 0–4.5% MgO, 0–7.1% CaO, 0.5–13% SrO and 2–21% BaO.

3. A flat panel display in accordance with claim 2 in which the glass panel has a CTE in the range of 32–40×10⁻⁷/°C. and the aluminosilicate sub-families consist essentially of:

a. 54–57% $SiO_2$, 17.5–23% $Al_2O_3$, 5 to less than 8% $B_2O_3$, 2–2.75% MgO, 1.5–<7% CaO, 2–6% SrO and 0.5–9.5% BaO, b. 57–65.5% $SiO_2$, 8–13% $Al_2O_3$, 4 to less than 8% $B_2O_3$, 2–3.5% MgO, 0–6.5% CaO, 0–13% SrO and 2–21% BaO.

4. A flat panel display in accordance with claim 1 in which the glass panel has a CTE in the range of 44–57×10⁻⁷/°C. and the glass is selected from a group of aluminosilicate sub-families consisting of glasses having compositions consisting essentially of, as calculated in weight percent on an oxide basis:

a. 50–57% $SiO_2$, 16–22% $Al_2O_3$, 0–5.5% $B_2O_3$, 0.5–3% MgO, 1–7.1% CaO, 0.5–15% SrO and 1–21% BaO, b. 55–67% $SiO_2$, 6–14% $Al_2O_3$, 0–7.5% $B_2O_3$, 0–6.5% MgO, 0–7.1% CaO, 0–15.5% SrO, 1–9.5% BaO and MgO+CaO+SrO+BaO being 16.5–28%.

5. A flat panel display in accordance with claim 4 in which the glass panel has a CTE in the range of 45–50×10⁻⁷/°C. and the aluminosilicate sub-families consist essentially of:

a. 50–57% SiO$_2$, 16–20% Al$_2$O$_3$, 0–5.5% B$_2$O$_3$, 2–2.75% MgO, 1–<7% CaO, 0.5–15% SrO and 1–21% BaO, b. 55–67% SiO$_2$, 6–<13% Al$_2$O$_3$, 0–7.5% B$_2$O$_3$, 2–6.5% MgO, 0–7.1% CaO, 14.5% SrO and 2–9.5% BaO.

6. A flat panel display in accordance with claim 1 in which the glass panel has a strain point greater than 660° C. and a weight loss less than 1 mg/cm$^2$ after immersion for 24 hours in an aqueous 5% by weight HCl solution at 95° C., the glass being selected from a group of aluminosilicate sub-families consisting of glasses having compositions consisting essentially of, as calculated in percent by weight on an oxide basis:

a. 54–58% SiO$_2$, 16–23% Al$_{23}$, 0–6% B$_2$O$_3$, 2–4.5% MgO, 1–7.1% CaO, 2.5–15.5% SrO and 0–14.5% BaO, MgO+CaO+SrO+BaO being 15–27%, b. 55–67% SiO$_2$, 6–14% Al$_2$O$_3$, 0–7.1% B$_2$O$_3$, 0–7% MgO, 0–7.1% CaO, 0–15% SrO, 1–21% BaO, MgO+CaO+SrO+BaO being 18–28%.

7. A flat panel display in accordance with claim 1 in which the glass panel has a density less than 2.5 grams/cc and a composition, as calculated in weight percent on an oxide basis, consisting essentially of 54.8–57% SiO$_2$, 16.8–21.8% Al$_2$O$_3$, 0 to less than 8% B$_2$O$_3$, 2.2–2.5% MgO, 1.5–7.1% CaO, 4.5–5.5% SrO, 0.1–14.5% BaO, MgO+CaO+SrO+BaO being 12.5–27%.

8. A method of producing a glass panel for a flat panel display which comprises melting a batch for an aluminosilicate glass consisting essentially of, as calculated in percent by weight on an oxide basis, 49–67% SiO$_2$, at least 6% Al$_2$O$_3$, the Al$_2$O$_3$ being 6–14% in conjunction with 55–67% SiO$_2$ and 16–23% in conjunction with 49–58% SiO$_2$, SiO$_2$+Al$_2$O$_3$>68%, 0 to less than 8% B$_2$O$_3$, at least one alkaline earth metal oxide selected from the group consisting of, in the indicated proportions, 0–21% BaO, 0–15% SrO, 0–7.1% CaO, 0–8% MgO and 12–30% BaO+CaO, SrO+MgO, and drawing a thin sheet of molten glass from the melt.

9. A method in accordance with claim 8 wherein the glass sheet is drawn by a float process.

10. An aluminosilicate glass exhibiting a strain point higher than 640° C., a weight loss less than 2.5 mg/cm$^2$ after immersion for 24 hours in an aqueous 5% by weight HCl solution at 95° C., a CTE between 31 and 57×10$^{-7}$/°C., nominally free of alkali metal oxides and having a composition consisting essentially of, as calculated in percent by weight on an oxide basis, 49–67% SiO$_2$, at least 6% Al$_2$O$_3$, the Al$_2$O$_3$ being 6–14% in conjunction with 55–67% SiO$_2$ and 16–23% in conjunction with 49–58% SiO$_2$, SiO$_2$+Al$_2$O$_3$>68%, 0 to less than 8% B$_2$O$_3$, at least one alkaline earth metal oxide selected from the group consisting of, in the proportions indicated, 0–21% BaO, 0–15% SrO, 0–7.1% CaO, 0–8% MgO and 12–30% BaO+CaO+SrO+MgO.

11. An aluminosilicate glass in accordance with claim 10 having a CTE in the range of 31–44×10$^{-7}$/°C. and being selected from a group of aluminosilicate sub-families consisting of glasses having compositions consisting essentially of, as calculated in weight percent on an oxide basis;

a. 49–58% SiO$_2$, 17.5–23% Al$_2$O$_3$, 0 to less than 8% B$_2$O$_3$, 0–8% MgO, 0–7.1% CaO, 0.4–13.5% SrO, 0–21% BaO, the glass containing at least one alkaline earth oxide in the indicated proportion and the total BaO+CaO+SrO+MgO content being 13–28%, b. 57–66% SiO$_2$, 8–14% Al$_2$O$_3$, 0 to less than 8% B$_2$O$_3$, 0–4.5% MgO, 0–9% CaO, 0.5–13% SrO, 2–21% BaO.

12. An aluminosilicate glass in accordance with claim 11 in which the glass has a CTE of 32–40×10$^{-7}$/°C. and the aluminosilicate sub-families consist essentially of:

a. 54–57% SiO$_2$, 17.5–23% Al$_2$O$_3$, 5 to less than 8% B$_2$O$_3$, 2–2.75% MgO, 1.5–<7% CaO, 2–6% SrO and 0.5–9.5% BaO, b. 57–65.5% SiO$_2$, 8–13% Al$_2$O$_3$, 4 to less than 8% B$_2$O$_3$, 2–3.5% MgO, 0–6.5% CaO, 0–13% SrO and 2–21% BaO.

13. An aluminosilicate glass in accordance with claim 10 having a CTE in the range of 44–57×10$^{-7}$/°C. and being selected from a group of aluminosilicate sub-families consisting of glasses having compositions consisting essentially of, as calculated in weight percent on an oxide basis:

a. 50–57% SiO$_2$, 16–22% Al$_2$O$_3$, 0–5.5% B$_2$O$_3$, 0.5–3% MgO, 1–7.1% CaO, 0.5–15% SrO, 1–21% BaO, b. 55–67% SiO$_2$, 6–14% Al$_2$O$_3$, 0–7.5 % B$_2$O$_3$, 0–6.5% MgO, 0–7.1% CaO, 0–15.5% SrO, 1–9.5% BaO, the total MgO+CaO+SrO+BaO being 16.5–28%.

14. An aluminosilicate glass in accordance with claim 13 in which the glass has a CTE in the range of 45–50×10$^{-7}$/°C. and the aluminosilicate sub-families consist essentially of:

a. 50–57% SiO$_2$, 16–20% Al$_2$O$_3$, 0–5.5% B$_2$O$_3$, 2–2.75% MgO, 1–<7% CaO, 0.5–15% SrO and 1–21% BaO, b. 55–67% SiO$_2$, 6–<13% Al$_2$O$_3$, 0–7.5% B$_2$O$_3$, 2–6.5% MgO, 0–7.1% CaO, 0–14.5% SrO and 2–9.5% BaO.

15. An aluminosilicate glass in accordance with claim 10 having a strain point greater than 660° C. and a weight loss less than 1 mg/cm$^2$ after immersion for 24 hours in an aqueous 5% by weight HCl solution at 95° C. and being selected from a group of aluminosilicate sub-families consisting of glasses having compositions consisting essentially of, as calculated in percent by weight on an oxide basis:

a. 54–58% SiO$_2$, 16–23% Al$_2$O$_3$, 0–6% B$_2$O$_3$, 2–4.5% MgO, 0–7.1% CaO, 2.5–15.5% SrO and 0–14.5% BaO, MgO+CaO+SrO+BaO being 15–27%, b. 55–67% SiO$_2$, 6–14% Al$_2$O$_3$, 0–7.5% B$_2$O$_3$, 0–7% MgO, 0–18.5 CaO, 0–15% SrO, 1–21% BaO, MgO+CaO+SrO+BaO being 18–28%.

16. An aluminosilicate glass in accordance with claim 10 having a density less than 2.5 grams/cc and a composition consisting essentially of 54.8–57% SiO$_2$, 16.8–21.8% Al$_2$O$_3$, 0 to less than 8% B$_2$O$_3$, 2.2–2.5% MgO, 1.5–7.1% CaO, 4.5–5.5% SrO, 0.1–14.5% BaO, MgO+CaO+SrO+BaO being 12.5–27%.

17. An aluminosilicate glass substrate exhibiting a strain point higher than 640° C., a weight loss less than 2.5 mg/cm$^2$ after immersion for 24 hours in an aqueous 5% by weight HCl solution at 95° C., a CTE between 31 and 57×10$^{-7}$/°C., nominally free of alkali metal oxides and having a composition consisting essentially of, as calculated in percent by weight on an oxide basis, 49–67% SiO$_2$, at least 6% Al$_2$O$_3$, the Al$_2$O$_3$ being 6–14% in conjunction with 55–67% SiO$_2$ and 16–23% in conjunction with 49–58% SiO$_2$, SiO$_2$+Al$_2$O$_3$>68%, 0 to less than 8% B$_2$O$_3$, at least one alkaline earth metal oxide selected from the group consisting of, in the proportions indicated, 0–21% BaO, 0–15% SrO, 0–7.1% CaO, 0–8% MgO and 12–30% BaO+CaO+SrO+MgO.

18. An aluminosilicate glass substrate in accordance with claim 17 having a CTE in the range of 31–44×10$^{-7}$/°C. and being selected from a group of aluminosilicate sub-families consisting of glasses having compositions consisting essentially of, as calculated in weight percent on an oxide basis;

a. 49–58% SiO$_2$, 17.5–23% Al$_2$O$_3$, 0 to less than 8% B$_2$O$_3$, 0–8% MgO, 0–7.1% CaO, 0.4–13.5% SrO, 0–21% BaO, the glass containing at least one alkaline earth oxide in the indicated proportion and the total BaO+CaO+SrO+MgO content being 13–28%, b. 57–66% SiO$_2$, 8–14% Al$_2$0$_3$, 0 to less than 8% B$_2$O$_3$, 0–4.5% MgO, 0–9% CaO, 0.5–13% SrO, 2–21% BaO.

19. An aluminosilicate glass substrate in accordance with claim 18 in which the glass has a CTE of 32–40×10$^{-7}$/°C. and the aluminosilicate sub-families consist essentially of:

a. 54–57% SiO$_2$, 17.5–23% Al$_2$O$_3$, 5 to less than 8% B$_2$O$_3$, 2–2.75% MgO, 1.5–<7% CaO, 2–6% SrO and 0.5–9.5% BaO, b. 57–65.5% SiO$_2$, 8–13% Al$_2$O$_3$, 4 to less than 8% B$_2$O$_3$, 2–3.5% MgO, 0–6.5% CaO, 0–13% SrO and 2–21% BaO.

20. An aluminosilicate glass substrate in accordance with claim 17 having a CTE in the range of 44–57×10$^{-7}$/°C. and being selected from a group of aluminosilicate sub-families consisting of glasses having compositions consisting essentially of, as calculated in weight percent on an oxide basis:

a. 50–57% SiO$_2$, 16–22% Al$_2$O$_3$, 0–5.5% B$_2$O$_3$, 0.5–3% MgO, 1–7.1% CaO, 0.5–15% SrO, 1–21% BaO, b. 55–67% SiO$_2$, 6–14% Al$_2$O$_3$, 0–7.5% B$_2$O$_3$, 0–6.5% MgO, 0–18.5% CaO, 0–15.5% SrO, 1–9.5% BaO, the total MgO+CaO+SrO+BaO being 16.5–28%.

21. An aluminosilicate glass substrate in accordance with claim 20 in which the glass has a CTE in the range of 45–50×10$^{-7}$/°C. and the aluminosilicate sub-families consist essentially of:

a. 50–57% SiO$_2$, 16–20% Al$_2$O$_3$, 0–5.5% B$_2$O$_3$, 2–2.75% MgO, 1–<7% CaO, 0.5–15% SrO and 1–21% BaO, b. 55–67% SiO$_2$, 6–<13% Al$_2$O$_3$, 0–7.5% B$_2$O$_3$, 2–6.5% MgO, 0–7.1% CaO, 0–14.5% SrO and 2–9.5% BaO.

22. An aluminosilicate glass substrate in accordance with claim 17 having a strain point greater than 660° C. and a weight loss less than 1 mg/cm$^2$ after immersion for 24 hours in an aqueous 5% by weight HCl solution at 95° C. and being selected from a group of aluminosilicate sub-families consisting of glasses having compositions consisting essentially of, as calculated in percent by weight on an oxide basis:

a. 54–58% SiO$_2$, 16–23% Al$_2$O$_3$, 0–6% B$_2$O$_3$, 2–4.5% MgO, 0–7.1% CaO, 2.5–15.5% SrO and 0–14.5% BaO, MgO+CaO+SrO+BaO being 15–27%, b. 55–67% SiO$_2$, 6–14% Al$_2$O$_3$, 0–7.5% B$_2$O$_3$, 0–7% MgO, 0–18.5 CaO, 0–15% SrO, 1–21% BaO, MgO+CaO+SrO+BaO being 18–28%.

23. An aluminosilicate glass substrate in accordance with claim 17 having a density less than 2.5 grams/cc and a composition consisting essentially of 54.8–57% SiO$_2$, 16.8–21.8% Al$_2$O$_3$, 0 to less than 8% B$_2$O$_3$, 2.2–2.5% MgO, 1.5–7.1% CaO, 4.5–5.5% SrO, 0.1–14.5% BaO, MgO+CaO+SrO+BaO being 12.5–27%.

\* \* \* \* \*

UNITED STATES PATENT AND TRADEMARK OFFICE
CERTIFICATE OF CORRECTION

PATENT NO. : 5,508,237
DATED : April 16, 1996
INVENTOR(S) : Moffatt et al.

It is certified that error appears in the above-indentified patent and that said Letters Patent is hereby corrected as shown below:

Column 5, lines 40-41, "10̄7" should be --$10^{-7}$--.

Column 5, line 55, "Sro" should be --SrO--.

Column 6, line 8, "Sro" should be --SrO--.

Column 7, line 15, "Sro" should be --SrO--.

Column 7, line 27, "Sro" should be --SrO--.

Column 11, line 4, "14.5% SrO" should be --0-14.5% SrO--.

Column 11, line 13, "$Al_{23}$" should be --$Al_2O_3$--.

Column 11, line 16, "0-7.1% $B_2O_3$" should be --0-7.5% $B_2O_3$--.

Column 11, line 64, "0-9% CaO" should be --0-7.1% CaO--.

Column 12, line 32, "0-7.1% CaO" should be --1-7.1% CaO--.

Column 12, line 35, "0-18.5% CaO" should be --0-7.1% CaO--.

UNITED STATES PATENT AND TRADEMARK OFFICE
CERTIFICATE OF CORRECTION

PATENT NO. : 5,508,237
DATED : April 16, 1996
INVENTOR(S) : Moffatt et al.

It is certified that error appears in the above-indentified patent and that said Letters Patent is hereby corrected as shown below:

Column 12, line 67, "0-9% CaO" should be --0-7.1% CaO--.

Column 13, line 18, "0-18.5% CaO" should be --0-7.1% CaO--.

Column 14, line 13, "0-7.1% CaO" should be --1-7.1% CaO--.

Column 14, line 16, "0-18.5% CaO" should be --0-7.1% CaO--.

Signed and Sealed this

Twentieth Day of August, 1996

Attest:

BRUCE LEHMAN

*Attesting Officer*     *Commissioner of Patents and Trademarks*